Oct. 21, 1958 W. L. TENNEY ET AL 2,857,332
MACHINE FOR PRODUCING DISPERSIONS OF LIQUIDS IN AIR OR OTHER GASES FOR THE PRODUCTION OF FOGS
Filed Aug. 19, 1949 3 Sheets-Sheet 1
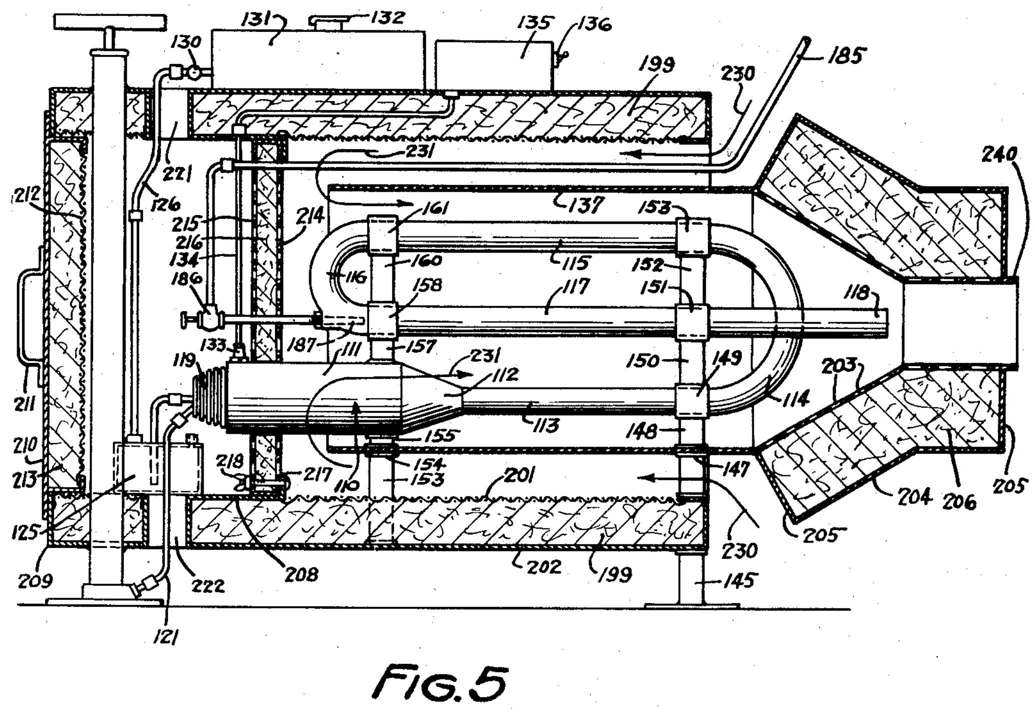
FIG. 5
FIG. 1
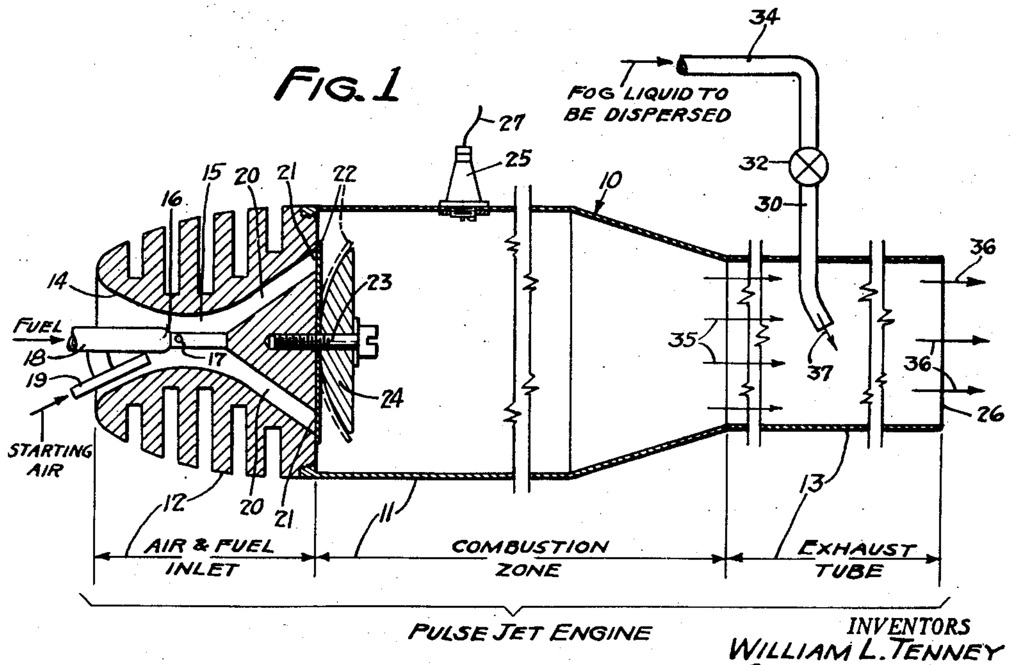
INVENTORS
WILLIAM L. TENNEY
SCOVILLE E. KNOX
PAUL A. FRANK
BY Paul, Paul & Moore
ATTORNEYS INVENTORS
WILLIAM L. TENNEY
SCOVILLE E. KNOX
PAUL A. FRANK
BY Paul, Paul & Moore
ATTORNEYS INVENTORS
WILLIAM L. TENNEY
SCOVILLE E. KNOX
PAUL A. FRANK
BY Paul, Paul & Moore
ATTORNEYS

United States Patent Office 2,857,332

Patented Oct. 21, 1958

2,857,332

MACHINE FOR PRODUCING DISPERSIONS OF LIQUIDS IN AIR OR OTHER GASES FOR THE PRODUCTION OF FOGS

William L. Tenney, Paul A. Frank, and Scoville E. Knox, Dayton, Ohio, assignors, by direct and mesne assignments, to William L. Tenney, Dayton, Ohio Application August 19, 1949, Serial No. 111,308

17 Claims. (Cl. 252—359)

This invention relates to machines for producing dispersions of liquids in air or other gases for the production of fogs. These machines are sometimes called "fog machines" and are used for the production of fine particle dispersions of liquids in air to produce "fogs," such as "fogs" of oil particles, as in the production of military smoke screens or "fogs" of insecticidal or the like liquids, which are used for the control of insect pests, fungi, molds, etc. Heretofore, the production of fogs, such as those exemplified above, has required heavy and expensive machine installations having numerous rotating parts and the dispersions produced by such prior machines are even then frequently of unsuitably large or widely varied particle size. Furthermore, the production of dispersions of liquids in air or other gases by such prior art machines has required high pressure steam or rotating equipment or both of complicated and expensive character, needful of frequent servicing and attention. Prior machines utilizing steam in conjunction with the fog fluid have been prone to rapid "coking" of the boiler tubes, requiring frequent replacement thereof, and prior machines not utilizing steam have suffered from both rapid "coking" of the fog fluid nozzles and associated parts and flashback and torching at the fog exit nozzle. It is an object of the present invention to provide an improved fog machine in which such difficulties are eliminated.

It is another object of the present invention to provide an improved fog machine of light weight, of readily portable character, capable of being readily carried by hand or by light field equipment, and also capable of being carried by airplanes, helicopters and the like.

It is a further object of the invention to provide an improved fog machine wherein fogs of oil or other fluids may be readily produced without use of high pressure steam of mechanically complex rotating equipment.

It is another object of the invention to provide fog machines wherein heavy liquids of high viscosity, discarded motor lubricating oil, dirty oils, as well as light oils and other liquids and also insecticidal and acaricidal control fluids may be dispersed readily for the production of fogs having a particle size which may be varied from large to small to suit the requirements of the fog operation and for masking, insect control and other purposes.

It is another object of the invention to provide improved fog machines of extremely low cost, simple construction, principally of thin sheet metal, yet strong, rugged and having improved operational characteristics, including inherent non-coking and non-torching qualities.

It is another object of the invention to provide improved fog machines wherein the dispersal of liquids used for the production of the fog is accomplished by introducing the liquid to be dispersed into the pulse jet blast of a pulse jet engine.

It is another object of the invention to provide an improved fog machine for the dispersal of insecticides and the like wherein the insecticide formulate is converted into a fog of the desired particle size with minimum application of heat, both from the standpoint of time and temperature, thus avoiding reduction in toxicity of the insecticide due to heat, and accomplishing more economic utilization thereof.

Other and further objects of the invention are those inherent in the apparatus herein illustrated, described and claimed.

The invention is illustrated with reference to the drawings wherein:

Figure 1 is a fragmentary longitudinal sectional view of the elemental parts of the liquid dispersing machine of the present invention, having removed therefrom all auxiliary elements of the machine;

Figure 5 is a side elevational view partially broken away and partially in section showing still another exemplary form of fog machine made in accordance with the present invention.

Throughout the specification and drawings corresponding numerals refer to the same parts.

Figures 2, 3, 6:
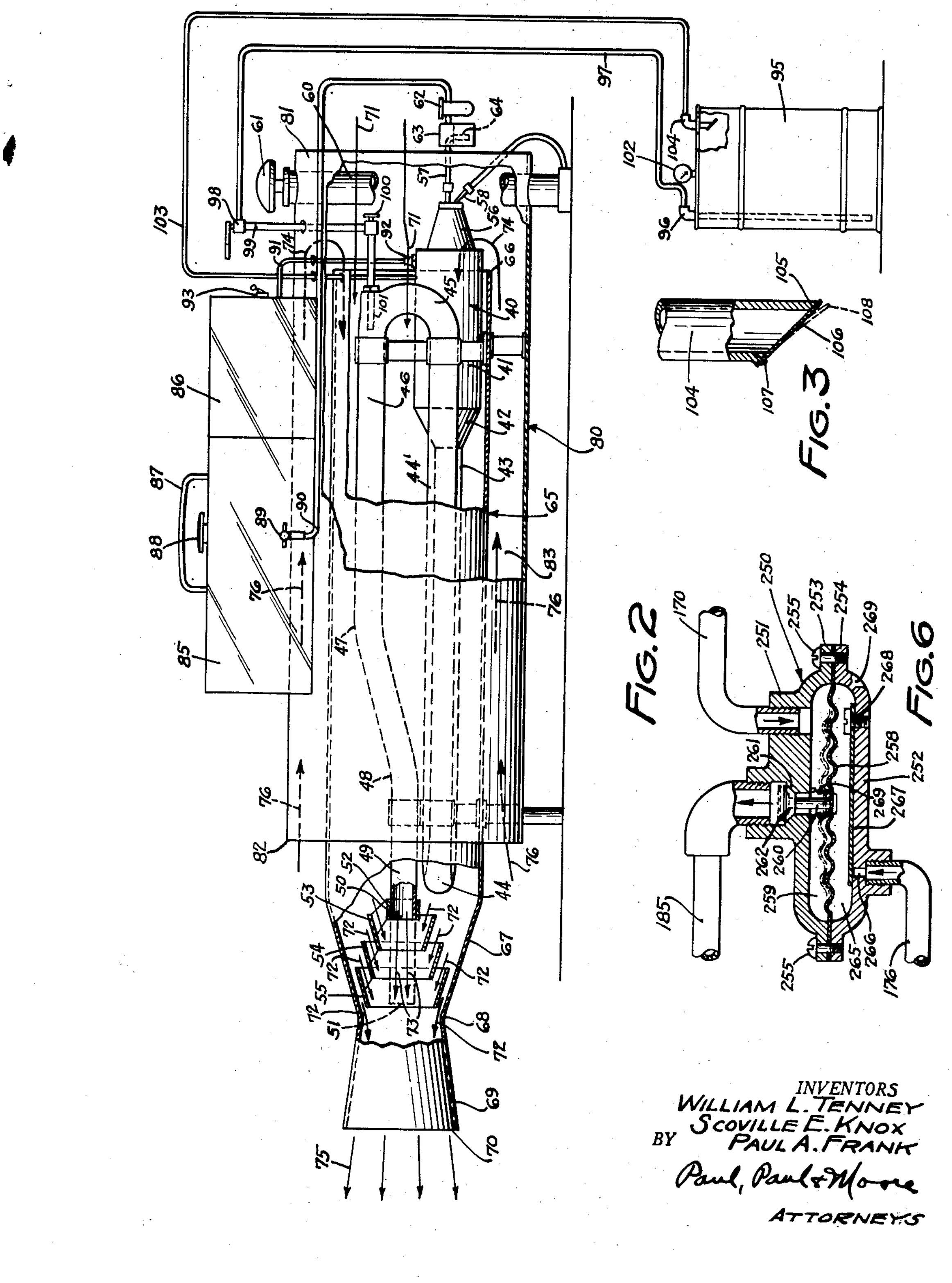
Figure 2 is a side elevational view of an exemplary form of fog machine showing the entire machine, the view being partially broken away and partially sectioned for better illustration of the invention.
Figure 3 is a side elevational view partially in section of a portion of the apparatus shown in Figure 2.
Figure 6 is an enlarged detail longitudinal sectional view of a modified form of fog liquid control valve operated by pulse jet engine combustion pressure.

Referring to Figure 1 there is in this figure illustrated the liquid dispersing machine of the present invention, with all auxiliary mechanisms and housing removed, for clarity of illustration. In Figure 1 there is illustrated a pulse jet engine generally designated 10 having a combustion zone 11, a fuel and air inlet portion 12 and an exhaust tube portion 13. This pulse jet engine is merely illustrative of pulse jet engines which may be utilized in the present invention, and may be the pulse jet engine of an aircraft or a non-propulsive pulse jet engine installation. It may be pointed out that in a pulse jet engine the combustion zone and exhaust tube portions, shown at 11 and 13 in Figure 1, may not be discrete and entirely separate elements for in many pulse jet engines the two portions, i. e. the combustion zone and exhaust tube, blend together both in construction and function. That is to say, in many pulse jet engines it is difficult to establish that portion of the apparatus wherein combustion ceases and the exhaust tube portion begins. However, in all pulse jet engines of this character there is a combustion zone portion in which combustion predominantly occurs and an exhaust tube portion from which the products of combustion are expelled in a series of pulses, hence the name pulse jet engine. Likewise, in many pulse jet engines, the combustion zone is of larger diameter or cross section than the exhaust tube portion of the engine, but this is not necessarily so for in some engines the combustion zone is equal to or even smaller in cross section as compared to the exhaust tube. Also, in many pulse jet engines a different form of inlet may be provided for the air and fuel than that shown in Figure 1. Accordingly, it is to be understood that Figure 1 is merely illustrative of a pulse jet engine, which may be utilized as a component part of the instant invention without a limitation thereon.

Referring to Figure 1 specifically, the air and fuel inlet portion 12 has an inlet opening 14 through which the combustion air enters. The combustion air passes through the throat 15 of the air inlet passage, also passing over the sloping step 16 in the fuel injection tube 18. Fuel ports 17 are provided in the fuel tube 18 directly down-stream from the sloping step 16, through which ports 17 the engine fuel is discharged in a spray, being drawn through the fuel tube 18 from a constant level fuel supply tank and sprayed out of the ports 17 by the high velocity intake of air through the passageway 14, 15. This fuel is metered in correct proportion with the incoming air by proper proportioning of the fuel ports 17, the size of the ports 17 being determined by the characteristics of the pulse jet engine, the fuel being used and the fuel pressure head existing at the ports 17. If desired, the fuel may be metered by means of an adjustable needle valve or metering orifice, not illustrated. A starting air inlet tube 19 is provided so that a jet of air may be blown through it from a starting air pump or tank in such a fashion as to draw fuel through the ports 17, which fuel is mixed with starting air from the tube 19 to form a combustible mixture. In starting, this combustible mixture is forced by the velocity of the air jet from starting inlet air tube 19 through the air inlet throat 15 and thence through a plurality of diverging passages 20 into the combustion zone 11.

At 21 the passages 20 appear as ports 21 which are covered by finger-like portions of a flexible steel or other metal valve 22 that is located centrally by the screw 23 serving to clamp the backing up plate 24 firmly against the central portion of valve 22. The finger-like portions of valve 22 which cover the valve ports 21 are sufficiently flexible to be deflected against backing up plate 24, as shown in dotted lines, by the inrushing fuel-air mixture when the engine is operating.

In starting, the fuel-air mixture is supplied as already described by means of the air jet issuing from starting air tube 19, which develops sufficient pressure to deflect the finger-like portions of the valve 22 and allow the starting fuel-air mixture to pass through the ports 21 and into the combustion zone 11. The starting fuel-air mixture thus introduced is ignited by the starting spark plug 25 which emits a continuous series of sparks fed through high tension lead 27 by an induction type vibrator spark coil, not shown in Figure 1. When the starting fuel-air mixture is ignited the resulting explosion causes the finger-like portions of valve 22 to close against intake ports 21, leaving exhaust tube 13 as the only path of exit for the combustion zone gases. The mass of gases in the exhaust tube 13, which constitutes a "slug" or "piston" of gases in the tube, are then driven forcibly and at extremely high velocity outwardly toward the open end 26 of the exhaust tube, by the expanding combustion gases produced by the explosion in the combustion zone 11.

The resulting extremely rapid forceful rush of gases out exhaust tube 13 causes a low pressure area in combustion zone 11 to ensue, which induces a fresh charge of combustible fuel-air mixture through the ports 21 and into the combustion port 11. Combustion air is thus drawn through the intake air passage 14—15 where it draws fuel through fuel ports 17. The resulting combustible mixture is passed through divergent passageways 20 and through the ports 21, past the finger-like portions of valve 22 which are deflected into the position shown in dotted lines by means of the low pressure condition induced in combustion zone 11 following the first explosion. Thus, after the first explosion the fuel-air charge is induced automatically and starting air need no longer be supplied through tube 19.

The low pressure condition existing in combustion zone 11 following the explosion also draws fresh air into exhaust tube 13 through its open end 26. The entrance of this fresh air in the opposite direction to arrows 36 is accompanied by a pressure wave which travels toward combustion zone 11 in the opposite direction to arrows 36 and 35. As a result of this reverse flow and pressure in exhaust tube 13, hot products of combustion from the preceding explosion, which have not all been eliminated from the tube, are forced into combustion zone 11 in the opposite direction to arrows 35 and impinge upon the freshly induced fuel-air charge therein. These hot products of combustion in combination with pressure and/or shock waves then ignite the fresh fuel-air charge and the combustion, charging, and ignition process repeats itself automatically and thereafter continuously at a high frequency dependent upon the engine tube proportions and other considerations. It may thus be seen that once the pulse jet engine is started, spark ignition is no longer required, ignition being carried out automatically by the cyclic operating process. The exact process of the automatic ignition phenomenon is at present not fully understood, even after years of study, but it exists as an observed fact in pulse jet engines and is believed to occur substantially as described above.

It will be observed that the above described action of pulse jet engines includes a very rapid cyclic back-and-forth movement of gases within the engine exhaust tube-combustion chamber system. This high frequency shaking action of the gaseous masses is, together with the temperatures and pressures involved, important in the production of dispersed fog particles and constitutes an important phase of the instant invention.

An engine of this type is illustrated in the copending application of William L. Tenney Serial No. 649,882, filed February 25, 1946, now Patent No. 2,609,660, issued September 9, 1952, and in that application the exhaust tube 13 is straight in character. However, it is not essential to the operation of a pulse jet engine to have a straight exhaust tube, but the exhaust tube may be extended and may be curved several times without impairing the efficiency of the engine for certain purposes. Hence, the exhaust tube 13 may be curved, as shown in the application of William L. Tenney and Charles B. Marks Serial No. 661,364, filed April 11, 1946. Accordingly, it is to be understood that the pulse jet engines which may be utilized as one component of the instant fog producing machine may have straight or curved exhaust tubes, the essential being that the engine be a pulse jet engine and that the exhaust from the pulse jet exhaust tube be cyclic in character and of high frequency.

The liquid dispersing apparatus of the instant invention utilizes a pulse jet engine of the aforesaid character and in addition includes one or more fog liquid delivery ports, as at 37, Figure 1, the delivery ports being situated inside the pulse jet engine exhaust tube. The fog-producing liquid is delivered at low pressure at port 37, which can be of large size, and the control of the fog liquid rate of flow is controlled by valve 32, by which the fog-particle size (and hence the "wetness" or "dryness" of the fog may be varied). The pressure of fog liquid in line 34 can be low, as by gravity feed, since the pressure is not needed for breaking up the fog liquid into particles at port 37.

The tube 30 can be relatively large diameter, for example a ¼-inch tube having at least a 3/16 inch internal diameter, and the tube therefore delivers into the exhaust stream of the pulse jet engine, a relatively large stream flow of liquid to be dispersed.

The cyclic discharge of gases from the pulse jet engine and accompanying cyclic in-rush of gases into the exhaust tube, all as explained above, occurs at sonic velocity during a part at least of each cycle, and many times per second. This violent pulsation and high velocity rush of gases back and forth through the pulse jet engine exhaust tube at many times each second, breaks up the fog liquid into particles even though the fog liquid is introduced in a solid stream flowing out of what is essentially the end of a pipe. By the construction illustrated there is eliminated any need for small hole vaporizing nozzles, which are one of the most serious faults of certain of the prior fog machines, wherein "coking up" and plugging of the small hole vaporizing nozzles and associated structures occurs after short periods of operation. The construction of the present invention also eliminates any need for the use of high pressure steam boilers which have been used in certain other prior fog machines, and in which "coking" of the boiler tubes is a common fault. In any event, the liquid being dispersed can be run through pipes 30 and delivered in a large flow without any more pressure than is necessary to cause the liquid to flow out. Thus, gravity feed from an overhead tank is quite satisfactory, or a pressure of a few pounds will suffice to deliver the liquid out of pipes 30. It is to be noted that the port 37 is merely the end of the pipe.

Another advantage of the apparatus for fog production of the present invention lies in the uniformity of particle size of the fog produced. It has been determined by test that the particles forming the fog produced by the apparatus herein described are of substantially uniform size for any setting of valve 32, although the particle size can be varied widely by changing the rate of flow by adjusting valve 32. This characteristic of particle size uniformity is of importance in both military screening smoke and in insecticide fog dispersal. In military work a smoke made up of varying particle sizes is unsatisfactory since the larger particles will settle to the ground rapidly and be lost, whereas the smaller particles will rise and blow away, leaving only that portion of fog made up of the desired particle size to persist as a screening agent. In indoor insecticide work any large size particles present in the fog will tend to settle and cause undesirable stains. In outdoor insecticide work, where staining may not be of importance, any fog particles of too small a size will tend to rise and blow away, thus being wasted, whereas large particle size causes undue waste by depositing a too large proportion of the fog or insecticidal liquid close to the machine.

Still another advantage of the utilization of extremely high velocity, high frequency, violently pulsating hot gases as present in exhaust tube 13 for fog production in accordance with the instant invention, lies in the fact that the fog liquid can be vaporized to the desired degree with minimum time of exposure to high temperatures. This results from the violent scrubbing and shaking action of the gases on the fog liquid and is of importance in insecticide work where toxicity of the insecticide is generally impaired by exposure to high temperatures for long periods. Insecticides are comparatively costly and the less heat the insecticide is exposed to, the more economical its use becomes.

It should be noted that the apparatus of the instant invention, as illustrated in Figure 1, performs the function of producing and dispersing fogs with the use of only one moving part, viz. valve 22. The advantages of this fact in terms of cost, maintenance, weight and mechanical simplicity are obvious in comparison with the engines, pumps, mechanical blowers, steam boilers, etc. found in prior machines.

Still another advantage of the fog producing machine described herein lies in the wide variety of sizes to which it is adaptable. The entire range of fog producing equipment from low capacity hand portable units to the highest capacity ship-borne and airborne types can be produced simply, lightly and economically.

Referring to Figure 2 there is illustrated a form of fog dispensing machine of the hand portable type. In this machine the pulse jet engine generally designated 40 has a combustion space 41 which is tapered down at 42 and connected to a long exhaust pipe at 43. The pipe 43 continues to the left, as shown in Figure 2, and is then curved at 44 and returns as a continuing portion of the exhaust tube, as at 44', being again curved at 45 and continued as portion 46 of the tube, thence around the bends 47 and 48 and to the exhaust tip portion 49, the tube being terminated either at 50 or extended and terminated as at 51, as shown in dotted lines in Figure 2. The exhaust end 50 of the tube is surrounded by a ferrule 52 which serves to support a plurality of converging conical members 53, 54 and 55 of increasing diameters, and expanding portion 69 of casing 66 in combination with throat 60, which serve as a multi-stage air aspirator which draws air as shown by arrows 72 through the action of the high velocity pulse jet exhaust gases as shown by arrows 73. The air thus aspirated serves to cool the pulse jet engine and surrounding structure, as well as aiding in vaporizing and dispersing the fog particles. When the tube 48 is terminated at 51, the aspirator nozzles 53, 54 and 55 may be eliminated, thus in cooperation with sections 67—68—69 forming a single stage aspirator.

The pulse jet engine 40 is also provided with an inlet venturi section as at 56 into which the fuel is introduced by way of line 57 and into which the starting air may be introduced by way of line 58, as previously described relative to Figure 1. In Figure 2, the starting air is provided by means of a hand pump 60 having handle 61, which produces starting air under pressure for initiating operation of the device, it being understood that once the pulse jet engine is started into operation the hand pump 60 need not thereafter be worked for the pulse jet engine automatically draws in the fresh air and fuel charge due to its operation, all as previously described. The pulse jet engine fuel flows by gravity from tank 85, through valve 89, line 90, fuel filter at 62 to float valve controlled fuel chamber at 63 for maintaining a constant level of pulse jet engine fuel into which the pulse jet engine fuel line 57 is adapted to dip, as indicated by the dotted line at 64. This construction provides for a constant level of fuel immediately ahead of the pulse jet engine 40 so as to provide uniform operating conditions.

The entire pulse jet engine 40, including the combustion chamber 41 and the exhaust tube portions 42 through 49 is housed within an inner cylinder generally designated 65 which extends from an open end 66 at the right in Figure 2 through a conical section at 67 to a throat at 68 and thence is flared outwardly at 69 to the exhaust end 70. The internal diameter of the tube 65 is sufficient to receive therein the entire pulse jet engine in spaced relation to the side walls of the tube 65 so as to provide adequate space through which cooling air may pass as indicated by the arrows 71, 74 and 76.

Outside the tubular member 65 there is positioned another cylindrical member 80 which is open at each end and extends from the right end 81, as shown in Figure 2, to the left end 82, the tubular member 80 being of sufficient diameter so as to provide a space 83 between it and the member 65 so as to permit a flow of cooling air therethrough.

Since members 65 and 80 are each open at both ends, a free air flow is available through them. The exhaust gases emanating from tube 49 of the pulse jet engine aspirate air through tube 65 from the open end 66 (right end Figure 2) through the aspirator section, as shown by arrows 72—72. This air, which enters tube 65 at open end 66, establishes a slight negative pressure at 66, causing an air inflow from through the exterior shell 80 from end 81 (as shown by arrows 71) and also a flow between tubes 65 and 80 from the left end 82 of tube 80, as shown by arrows 76 and 74. This flow of air is important where the unit has a self contained fuel and battery-coil containers mounted thereon. The flow of air via arrows 76, 74 and 71 cools the exterior shell 80, and the partially heated air is then additionally heated in flowing within tube 65 over and around hot pulse jet engine 40, before being aspirated and mixed with the engine exhaust-fog mixture and delivered as fog output at 70.

On top of the member 80 there is provided a pulse jet engine fuel tank 85 and a pulse jet engine starting ignition battery and spark coil box at 86. A handle is provided at 87 so that the operator may carry the entire device. The fuel tank is provided with a filler cap at 88. From the fuel tank a line extends through the valve 89 and thence over line 90 to the fuel filter 62 previously described. From the starting ignition battery and spark plug box there extends a high tension ignition line 91 which leads to the spark plug 92 of the pulse jet engine. A switch is provided at 93 for turning on the ignition during the start and for turning it off after the engine is started, it being noted again that once the engine is in operation continuous ignition is no longer necessary, the cyclic ignition of the cyclically introduced fuel-air charges being accomplished automatically through the operation of the engine.

Into the pulse jet engine there is introduced the liquid to be dispersed. This liquid is preferably contained in an outside container which can conveniently be an oil drum such as drum 95. Into the oil drum there is screwed the adaptor pipe 96 which extends almost to the bottom of the drum and from the upper end of this pipe there extends the connection pipe or flexible hose 97 which leads through a quick shut-off valve 98 to the pipe 99 and thence through the flow control needle control valve 100 and thence through the tube 101 into the exhaust tube portion 45—46 of the pulse jet engine. The flow of liquid to be dispersed from the tank 95 through line 97, valve 98 and line 99, valve 100 and pipe 101 into the pulse jet engine exhaust pipe 45—46 is accomplished by a low pressure system as follows:

From the combustion chamber portion 41 of the pulse jet engine a pipe or flexible hose 103 extends to a fitting 104 on the top of the barrel or other closed container 95. The fitting 104 has a diagonally cut lower end as at 105 in Figure 3 and over this lower end there is provided a thin and flexible valve member 106 which is attached to the fitting by means of the screw or other fastening 107 and is free to flex outwardly under pressure to the dotted line position, as shown at 108 in Figure 3. The pulses of pressure from the combustion chamber 41 of the pulse jet engine are transmitted through the line 103 and into the fitting 104 and these pulses of pressure within the fitting 104, the peak pressures ranging from 10 to 20 pounds, cause the flexible member 106 to be flexed outwardly at each pulse, thus permitting a small amount of gases under pressure to be introduced into the upper portion of the container 95. After each positive pressure wave (or pulse) subsides in the tube 103 due to the subsiding of the pressure in the combustion chamber 41, the valve 106 again seats upon the surface 105, thus preventing the pressure which is developed within the container 95 from leaking therefrom. Successive pulses of pressure thus introduced through line 103 from the combustion chamber 41 of the pulse jet engine serve to build up the pressure within the container 95 until there is established in the container 95 a pressure which is sufficient to hold the valve 106 closed against the pulses of pressure applied to it from the interior of the fitting 104. A pressure gauge is preferably included as at 102 to show the drum pressure. So long as the pressure is high enough within the container 95, the valve 106 will not open, but as the pressure gradually goes down due to the flow of liquid from the container 95, enough gas will be introduced through the valve 106 at each peak of pressure which is communicated through line 103 and fitting 104 to permit the introduction of additional gases into the upper portion of the container 95 and thus maintain the pressure therein. In this way the pulse jet engine is caused to perform an auxiliary service, thus establishing a suitable pressure for moving the liquid to be dispersed from an exterior container to the apparatus for dispersing the liquid into a fog. It should be noted that through use of valve member 106 the pressure in container 95 may be maintained considerably higher than the mean pressure in the combustion chamber 41.

By regulating valve 100 the rate of fog liquid flow can be varied so as to produce any type fog from a small particle size (dry) fog to a large particle size (wet) fog. The various types of fog liquid vary widely in viscosity and other characteristics and the valve 100 is therefore adjusted to suit the particular fog liquid being used and type of fog desired to be produced. Valve 98 permits rapid and complete shut-off so as to stop the flow of fog liquid immediately when desired.

By utilizing the aforesaid apparatus it is possible to provide large amounts of heavy fog of dense character suitable for screening effect in military operations and also to provide fogs of insecticidal-acaricidal type, for the control of insects, fungi and other pests, both outdoor and indoor. It may be noted in passing that the liquid to be dispersed and which in the dispersed phase produces the fog, would seem to be subjected to high temperatures in the pulse jet engine. However, the dispersion of the liquid and ejection from the machine is an endothermic reaction and takes place so rapidly that relatively little heating of the particles of fog actually takes place and then only for a short time. Hence, insecticidal-acaricidal properties of the liquid are not lost due to undue heating of the particles within the machine since the time of heating is so very short and the amount of heating is so slight.

Figure 4:
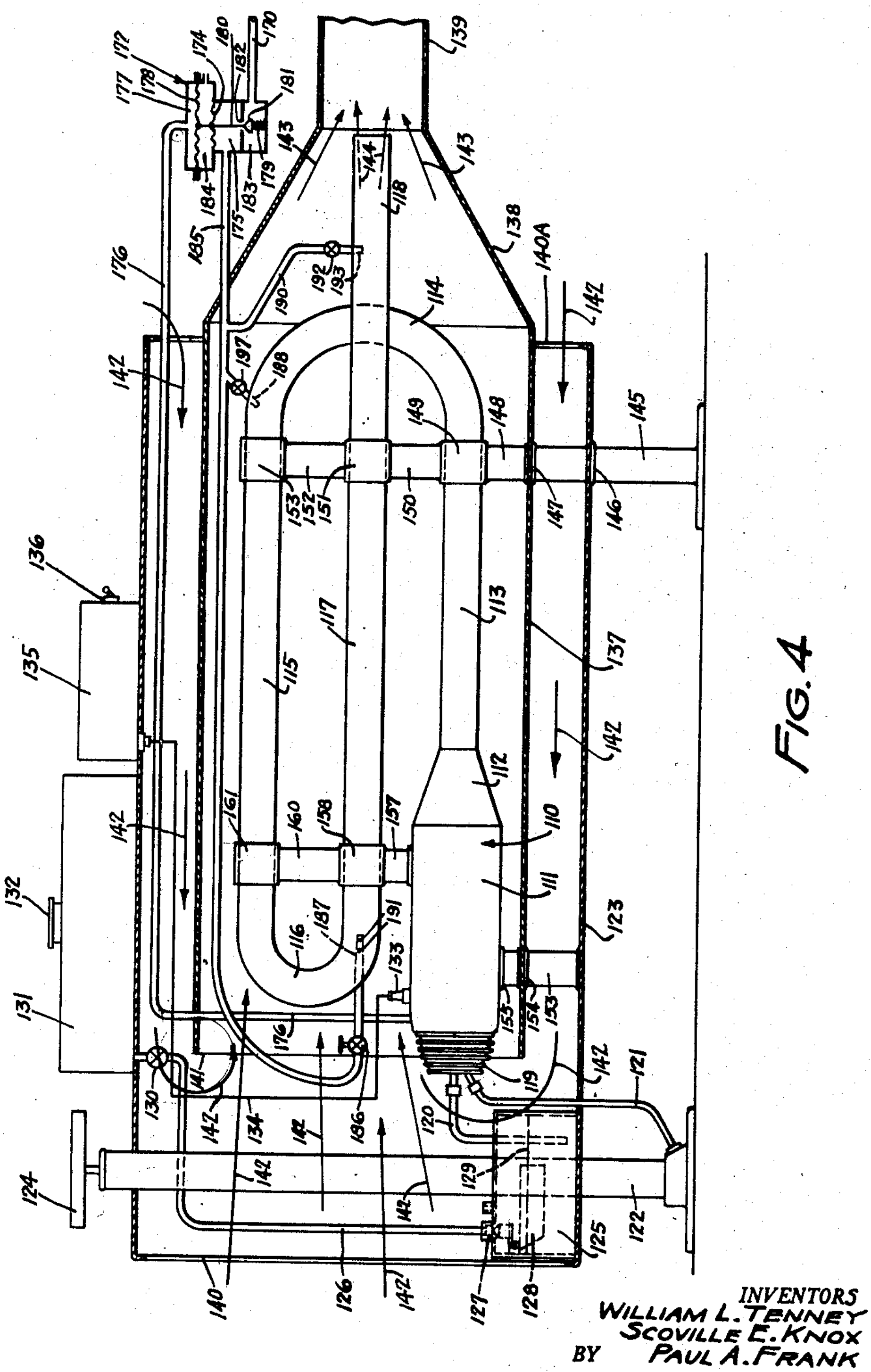
Figure 4 is a side elevational view partially broken away and partially in section of another exemplary form of fog machine made in accordance with the present invention.

Referring to Figure 4 the apparatus therein illustrated is very similar to that shown in Figure 2, there being shown a pulse jet engine 110 having a combustion chamber portion 111 which is connected through the converging section 112 to the exhaust pipe 113 which curves at 114 into the straight section 115 which is again curved at 116 into the straight section 117 which exhausts at the end 118. The pulse jet engine also includes a fuel-air inlet venturi and valve plate 119 similar to that shown in Figure 1, there being provided a fuel inlet tube 120 and a starting air inlet tube 121 which is connected to the base of the pump 122, the pump extending upwardly through the housing 123 and out of the housing at the top thereof and provided with a handle 124. The pipe 120 dips into the float tank 125 which is supplied with pulse jet engine fuel through line 126 and the float valve 127, the latter being adapted to be closed by means of the float member 128 so as to maintain a constant level of fuel at 129 within the tank 125. The tank 125 is vented. The line 126 extends through the cut-off valve at 130 to an outside tank 131 on the upper side of the housing 123. The tank 131 is provided with a filler inlet at 132. The pulse jet engine has a starting ignition plug at 133 which is connected by the high voltage ignition wire 134 to the ignition coil, not illustrated, within the ignition coil and battery box 135. A switch is provided at 136 for turning the ignition on and off. Within the housing 123 there is an inner housing 137 which is of sufficient diameter so as completely to enclose the pulse jet engine 110, including its exhaust pipe 112—118.

The housing 137 has a conical end at 138 and is provided with an exhaust passage at 139. The end 140 of the housing 123 is open, although it may be screened, if desired. Housing 123 is also open at 140A and air may therefore flow through the opening 140 at the left end and 140A at the right end, as indicated by arrows 142 and enters the open end 141 of the inner housing 137 in the manner described with reference to Figure 2. This inflow of air serves to cool the pulse jet engine and exhaust tube and after flowing through the housing is mixed in the passage 139 with the exhaust gas-fog mixture emanating from end 118 of exhaust tube 117, as shown by converging arrows 143—144. The tube 139 can be equiped with a flexible extension duct, not shown, for conveying the fog to, for example, the inside of a house, or with a directional deflector (not shown) for aiming the fog flow in particular directions for outdoor work.

The housing 137 is supported at the right end, as shown in Figure 4, by a pair of posts aligned one behind the other at 145, which are attached at 146 to the housing 123 and at 147 to the housing 137. These posts, in cooperation with the pump 122 and post 153 serve to center the housing 137 within the housing 123 and to support the entire device over the surface on which it is placed. An upward extension on post 148 is provided with a sleeve 149 through which the straight portion 113 of the pulse jet engine is adapted to extend and slide freely while being supported snugly therein. From the sleeve 149 there extends up a post 150 which is likewise joined to a sleeve 151 through which the straight portion 117 of the pulse jet engine also extends and above the sleeve 151 the post 152 extends upwardly to the sleeve 153 through which the straight portion 115 of the pulse jet engine exhaust tube extends. Thus, the tubular portions 113, 117 and 115 of the pulse jet engine are free to slide within the supporting sleeves 149, 151 and 153, respectively. At the opposite end of the housing 123 the pump 122 serves not only as a pump, but also as a post to support the housing 123. From the housing 123 there extends a post 153 which is attached to the housing 137 at 154 and extends upwardly therefrom and is solidly attached at 155 to the pulse jet engine 110. From the upper portion of the pulse jet engine combustion chamber 111 there extends a post 157 which is provided with a sleeve 158 through which the straight portion 117 of the pulse jet engine exhaust tube is adapted to slide and at the upper portion of the sleeve there is another spacer post 160 terminating in the sleeve 161 which serves to support the left end of pipe 115, as shown in Figure 4. Thus, the only attachment of the pulse jet engine is at post 153, the remaining portions of the engine being free to slide in the various supporting sleeves. This permits the movement of the pulse jet engine exhaust tube in the sleeves due to expansion and contraction on heating and cooling and thus permits the engine to heat and cool freely without binding effect. A similar system of supports is shown in Figure 2.

From an exterior source, not shown, there is provided a line 170 through which the liquid to be dispersed into fog particles is introduced into a valve mechanism generally designated 172. The valve mechanism 172 is provided for turning on and off the liquid from line 170, in response to operation (valve on) or lack of operation (valve off) of the pulse jet engine 110. This is accomplished as follows: From the pulse jet engine combustion chamber 111, pipe 176 extends into the upper chamber 177 of the valve member 172. The upper chamber is a pressure chamber having a flexible diaphragm wall 178 therein which is ordinarily forced upwardly by a spiral spring 179 on the valve stem controlled by diaphragm 178. From the center of the diaphragm 178 a stem 180 extends downwardly through chamber 184, which is ported to atmosphere, and thence into valve chamber 175, which is separated from chamber 184 by a small area flexible diaphragm 174 which may be replaced by a stuffing box if desired. The stem passes through valve seat 182 which is arranged to be closed by valve member 181 on stem 180. Compression spring 179 in inlet chamber 183 serves normally to push upwardly on stem 180 and close valve 181 on seat 182. Inlet line 170 leads into chamber 183 and outlet 185 leads from chamber 175. So long as there is no pressure on the diaphragm 178 spring 179 closes valve 181 on seat 182, but when the engine 110 is operating, engine combustion pressure exerted through small gauge line 176 is delivered steadily to chamber 177, even though the engine pressure pulsates, and depresses diaphragm 178 opening valve 181—182. This condition continues so long as the engine operates, it being noted that the diaphragm 178 with the average engine combustion pressure upon it is sufficient to overcome the upward thrust of liquid pressure upon diaphragm 174. When the engine 111 stops, pressure immediately bleeds out of chamber 177 through line 176, thus permitting valve 181—182 to be closed by spring 179, shutting off flow of fog liquid.

The oil in line 185 which is thus turned "on" whenever the pulse jet engine is running and is turned "off" whenever the pulse jet engine stops, is introduced into the pulse jet engine at any one or more of three places, all within the engine exhaust tube. Thus, the line 185 extends to the left, as shown in Figure 4, and after passing through the flow control valve 186 is introduced through the tube 187 into the curved portion 116 just before reaching the straight section 117 of the pulse jet tube. Alternatively, the flow of liquid to be dispersed from line 185 may be passed through the flow control valve 197 and into the tube 188, thus introducing the liquid to be dispersed into the pulse jet gas flow at a point farther upstream from the exhaust outlet 118. Again from a branch line 190 the liquid to be dispersed may be introduced through the flow control valve 192 and tube 193 into the jet exhaust tube just before the exhaust leaves the outlet portion 118 of the tube. If desired, the tubes 30 of Figure 1, 101 of Figure 2 or 187, 188 or 193 of Figure 4 or 187 of Figure 5, to be described, may be provided with simple side ports, as shown at 191 on tube 187 of Figure 4.

By means of the flow control valves 186, 197 and 192 the point at which the fuel may be introduced can be selected as desired by the operator during the use of the machine.

Referring to Figure 5 there is illustrated a somewhat modified form of fog producing machine which is so enclosed as to minimize the amount of noise emitted by the machine during the production of the fog.

The general construction of the machine is similar to that shown in Figure 4 and therefore will not be further described in detail. However, it will be noted that the exterior shell corresponding to the shell 123 of Figure 4 is composed of a double wall, as at 201—202, the wall 201 being of expanded metal or wire screen cloth and the space therebetween being fully packed with sound absorbent material 199, such as rock wool, steel wool, glass fiber or other sound-absorbing material. Likewise, the outer conical end corresponding to portion 138 of Figure 4 is apertured as at 203 and an outer shell is provided at 204—205 and the space therebetween filled with such sound-absorbing material 206. The wall 201 which is of expanded metal or screen cloth is made of solid material at 208 and continues to the end closure 209 where it is closed off. A lid is provided at 210, the lid having a solid outer plate provided with a handle 211 and a wire cloth inner plate 212, a packing of sound absorbing material 213 again being provided between them. An intermediate wall is provided at 214, the wall being double in character, as indicated at 215, and the space 216 between them being filled with sound insulating material. It is noted that the two wall members 214 and 215 are of the so-called "expanded metal" so as to permit the absorption of sound through the holes into the sound absorbing material 216. A flange is provided at 217 and a plurality of wing nuts at 218 around the flange by means of which the wall 214—215 is thereby attached solidly within the unit, it being noted that the air and fuel inlet end 119 of the engine extends through an aperture in the walls 214—215 and that the spark plug 133 is mounted in the space between the walls 212 and 215. The high tension ignition lead 134 extends upwardly and thence through the sound insulating material 199 and into the spark coil and battery box 135. Fuel from the tank 131 enters through the fuel shut-off valve 130 and the line 126 passes down through a comparatively large aperture 221 into the space between the walls 212—215. At the bottom of this space there is also provided an aperture 222 through which the starting air hose 121 is adapted to pass upwardly. It may be noted that the vented float valve tank 125 into which the line 126 extends and the inflowing fuel to the engine is valved to a constant level, is situated at the side of aperture 222 and therefore does not obstruct the inflow of air therethrough. The apertures 221 and 222 and the walls 212—215, together with the inner wall 208 of the main housing thus in effect define a chimney through which heat from the inlet end of the engine may be dissipated. The liquid to be dispersed into fine particles in production of the fog is introduced through line 185, as in Figure 4, and after passing through the flow control valve 186 and an automatic shut-off valve, such as that shown at 172 in Figure 4, if desired, is introduced through the tube 187 into the straight section 117 of the jet exhaust tube of the pulse jet engine. The numerals showing the various parts of the engine 110 in Figure 5 and the support therefor correspond to those shown in Figure 4. The cooling air for the pulse jet engine enters by way of arrows 230 and after passing between the walls 137 and 201 continues into the interior of the tubular portion 137, as indicated by the arrows 231, and thence passes through the conical section 203 and co-mingles with the gases emanating from the end 118 of the jet exhaust pipe 117. The liquid to be dispersed as a fog entering through the line 185 and tube 187 is broken down into minute particles by the pulse jet action previously described, and produce a fog which is a mixture of exhaust gases, air and particles of liquid dispersed therein. The exhaust gases, after leaving the end 118 of the exhaust tube, are diluted and mixed with cooling air and thence are delivered at the exhaust end 240 of the apparatus as the fog output of the machine. The enclosure of the pulse jet engine within the apparatus described greatly reduces the noise.

In Figure 6 there is illustrated a modified form of fog liquid control valve generally designated 250 which can be substituted for valve 172 of Figure 4, if desired. Valve 250 is composed of upper case member 251 and lower case member 252, each of which has a flat peripheral flange, as at 253 and 254. Between the flanges, which are held together by screws 255, there is clamped a flexible diaphragm 258 which, being circularly corrugated, is free to flex up and down. Diaphragm 258 with upper case member 251 forms a valve chamber 259, into which the fog liquid is introduced via pipe connection 170. To the center of diaphragm 258 is attached a valve stem 260 which passes up through valve port 261 and terminates in valve 262 which closes the port and hence shuts off the flow of oil to pipe 185 whenever the diaphragm 258 is in the normal position shown in full lines. A spring 269 may be included, if desired, between casing 251 and diaphragm 258 to assist in holding valve 262 on seat 261 when engine combustion pressure is not applied to the underside of diaphragm 258. The spring may be omitted where the oil entering via pipe 170 has sufficient pressure or the diaphragm 258 exerts a sufficient downward resilient pressure in the valve 262. It will be noted that pressure of the fog liquid which is introduced via pipe 170 under low pressure (viz. by gravity or at the most a few pounds pressure) pushes down on diaphragm 258 and tends to seat the valve 262 more tightly in seat 261.

Diaphragm 258 also forms with case 254, a lower chamber 265 through which pulse jet engine pressure is introduced via pipe 176 as in Figure 4. Pipe 176 terminates at port 266 which is covered by a flexible spring valve 267 which is fastened inside chamber 265 by screw 268. Pulse jet engine pressure reaches a high peak once for each pulse cycle and hence through pipe 176 there is introduced pulses of pressure, each of which serves to lift valve 267 so as to build up a pressure in chamber 265, which serves when it builds up to flex diaphragm 258 upwardly and open valve 261—262. The pressure in chamber 265 is relieved through bleeder port 269 which, by gradually and continuously bleeding off pressure of chamber 265, insures that valve 261—262 will be closed when the pulse jet engine stops.

The entire valve 250 can be substituted for valve 172 of Figure 4, it being noted that the pipe connections 185, 170 and 176 of Figure 6 correspond to Figure 4.

By shutting off the flow of fog producing liquid there is provided, by the illustrated apparatus, a large flow of hot gases which may be used wherever desired as for drying or heating operations.

As many apparently widely different embodiments of this invention may be made without departing from the spirit and scope thereof, it is to be understood that we do not limit ourselves to the specific embodiments herein.

What we claim is:

1. An apparatus for producing dispersions of atomized liquid particles comprising a resonant pulse jet combustion unit including a combustion chamber for receiving combustible mixtuers of fuel and air, an exhaust tube having one end opening freely into said combustion chamber and having an open discharge at its opposite end, said exhaust tube and combustion chamber forming integral and mutually dependent parts of a resonant combustion system wherein combustible mixtures of fuel and air are cyclically fired and the high temperature exhaust gases thus formed flow pulsatingly through and from said exhaust tube, said pulsating flow of exhaust gases being accompanied by a cyclic reversal of flow thus producing a highly turbulent, high velocity stream of high temperature gases, and a supply conduit opening into the wall of said exhaust tube in advance of said open discharge end thereof for introducing into the pulsating flow of gases in said exhaust tube a substantially non-atomized flow of the liquid to be dispersed, whereby said high temperature, high velocity, cyclically reversing highly turbulent flow of exhaust gases reacts upon said liquid flow to cause atomization and vaporization thereof within said tube to discharge into the atmosphere from said tube a dispersion of atomized particles of said liquid.

2. The apparatus of claim 1 further characterized in that said jet exhaust pipe is curved back and forth.

3. The apparatus of claim 1 further characterized in that a plurality of liquid delivery pipes are provided each extending into the exhaust pipe, said plurality of liquid delivery pipes being located so as to deliver the liquid to be dispersed into selected locations along the length of the exhaust pipe.

4. A fog machine comprising a combustion unit as defined in claim 1 in combination with a housing tube having a converging end terminating in an exhaust nozzle, said resonant pulse jet combustion unit being located in said tube and spaced from the walls thereof providing a space for an induced flow of cooling air, said pulse jet combustion unit having a jet exhaust pipe located so as to exhaust through said tube nozzle to induce said flow of cooling air, said pulse jet combustion unit also having a starting air tube and fuel supply tube, a fuel tank mounted on the housing tube, and a hand pump mounted on the housing tube and connected to said starting air tube.

5. An apparatus for producing dispersions of liquid in gases comprising a resonant pulse jet combustion unit as defined in claim 1, said unit having an exhaust pipe extending therefrom defining a path through which a jet exhaust of said combustion unit is cyclically expelled, a cylindrical container around said pulse jet combustion unit and terminating in a delivery pipe, the exhaust pipe of the pulse jet combustion unit being directed through said delivery pipe for aspirating air therethrough.

6. An apparatus for producing dispersions of liquid in gases comprising a resonant pulse jet combustion unit having a combustion chamber and an exhaust pipe extending therefrom in resonance therewith defining a continuous and confined path through which a pulsating jet exhaust of said unit is cyclically expelled, a supply conduit for introducing a flow of substantially non-atomized liquid which is to be dispersed into said exhaust pipe in advance of the open end thereof and into said path of said cyclically expelled jet exhaust gases with a resultant breaking up of said liquid flow under the action of said pulsating flow of gases into a finely divided dispersion, a housing having an opening thereinto around said resonant pulse jet combustion unit terminating in an exhaust nozzle surrounding the end of said resonant pulse jet combustion unit exhaust pipe but spaced therefrom.

7. The apparatus of claim 6 further characterized in that a plurality of cones surround the end of said exhaust nozzle, said cones being spaced from each other and from the exhaust pipe and exhaust nozzle so as to permit air to be drawn therethrough.

8. The apparatus of claim 6 further characterized in that the resonant pulse jet combustion unit is fixedly attached at one of its ends to the housing and is movably attached at another point to said housing.

9. The apparatus of claim 6 further characterized in that the housing is double-walled and has a sound absorbing filling therein.

10. An apparatus for producing dispersions of liquid in gases comprising a resonant pulse jet combustion unit having a combustion chamber and an exhaust pipe forming essential operating parts of said unit with said exhaust pipe extending therefrom defining a continuous and confined path through which a pulsating jet exhaust of said combustion unit is cyclically expelled, means for introducing a flow of substantially non-atomized liquid which is to be dispersed into said exhaust pipe in advance of the open end thereof and into said path of said cyclically expelled jet exhaust gases, said means for introducing liquid including a closed container for said liquid and a pipe therefrom terminating in said exhaust pipe in the path of cyclically expelled jet exhaust gases, a pressure conduit connected to a portion of said combustion unit in which positive pressure is cyclically developed and also connected to said container, and a check valve in said conduit oriented so as to check flow from the container to the combustion unit.

11. The apparatus of claim 10 further characterized in that said check valve is a leaf spring valve.

12. An apparatus for producing dispersions of liquid in gases comprising a resonant pulse jet combustion unit having a combustion chamber and an exhaust pipe forming essential operating parts of the unit, said exhaust pipe extending therefrom defining a continuous and confined path through which a jet exhaust of said combustion unit is cyclically expelled, means for introducing a flow of liquid which is to be dispersed into said exhaust pipe in advance of the open end thereof and into said path of said cyclically expelled jet exhaust gases, said means for introducing liquid including a pipe extending from a liquid supply under pressure, said pipe terminating in said exhaust pipe in the path of cyclically expelled jet exhaust gases, and a pressure operated valve having a pressure actuating line, said valve being connected to said line for opening the line to permit liquid to flow therethrough when pressure is applied to said valve and for closing the line when pressure is released, the pressure actuating line of said valve being connected to a portion of said pulse jet combustion unit in which pressure is developed during operation thereof.

13. An apparatus comprising a pair of cylinders, each open at one end and of different diameters and arranged with the smaller within the larger, the smaller terminating with one end between a first end of the larger cylinder and with the other end extending beyond a second end of the larger cylinder and shaped with a delivery tube thereon, a pulse jet combustion unit having an inlet end positioned within the smaller cylinder, said pulse jet unit having a combustion chamber and an exhaust pipe opening directly thereinto and forming therewith an integral combustion system resonant in gases, the outlet of said exhaust pipe being on the end thereof opposite said inlet directed so as to deliver exhaust gases through said delivery tube for aspirating air through said smaller cylinder and delivering it out of said delivery tube and creating a draft between said larger and smaller cylinder and through the open ends of said cylinders for cooling the assembly, and a supply conduit opening into said exhaust pipe in advance of the discharge end thereof for introducing a substantially non-atomized flow of liquid into said exhaust pipe for discharge from the end thereof of a dispersion of atomized particles of said liquid.

14. The apparatus of claim 13 further characterized in that the delivery tube is in the shape of a Venturi tube.

15. The apparatus of claim 13 further characterized in that a baffle wall is provided across said larger cylinder between the end of the smaller cylinder and said first end of the larger cylinder and a closure plate across said first end of said larger cylinder, said pulse jet combustion unit inlet end being extended into the space between the closure plate and baffle wall.

16. The apparatus of claim 15 further characterized in that said cylinders are made with spaced sound absorbing double walls.

17. An apparatus for producing dispersions of liquids in gases comprising a resonant pulse jet combustion unit having a combustion chamber and an exhaust pipe extending therefrom forming integral and mutually dependent parts of a resonant combustion system, said exhaust pipe defining a path through which a jet exhaust of said combustion unit is cyclically expelled, means for introducing a liquid which is to be dispersed into said exhaust pipe in advance of the open end thereof and into said path of said cyclically expelled jet exhaust gases, said means for introducing liquid including a closed container for said liquid and a delivery pipe therefrom opening into said exhaust pipe in the path of cyclically expelled jet exhaust gases for delivering thereto a substantially non-atomized flow of said liquid, a pressure conduit connected to a portion of said combustion unit in which positive pressure is cyclically developed, means including said pressure conduit for deriving a source of pressure from the peaks of said cyclically developed pressure within said combustion unit, and means for applying said derived source of pressure to said closed container to effect delivery of said liquid therefrom.

References Cited in the file of this patent

UNITED STATES PATENTS

| | | |
|---|---|---|
| 1,216,565 | Hay et al. | Feb. 20, 1917 |
| 1,369,672 | Koenig | Feb. 22, 1921 |
| 1,606,032 | Kolstrand | Nov. 9, 1926 |
| 1,983,405 | Schmidt | Dec. 4, 1934 |
| 2,074,098 | Adams | Mar. 16, 1937 |
| 2,077,043 | Gehnrich | Apr. 13, 1937 |
| 2,142,601 | Bleecker | Jan. 3, 1939 |
| 2,164,954 | Stephens | July 4, 1939 |
| 2,234,001 | Gistucci | Mar. 4, 1941 |
| 2,396,968 | Phillips | Mar. 19, 1946 |
| 2,422,024 | Levy et al. | June 10, 1947 |
| 2,476,171 | Williams | July 12, 1949 |
| 2,486,967 | Morrisson | Nov. 1, 1949 |
| 2,518,364 | Owen | Aug. 8, 1950 |
| 2,609,660 | Tenney et al. | Sept. 9, 1952 |
| 2,612,748 | Tenney et al. | Oct. 7, 1952 |

OTHER REFERENCES

Bibliography of Scientific and Industrial Reports, vol. 9, No. 11, page 1027.

Karcher: German patent application, 138,004, February 25, 1943, published June 11, 1948, frames 8907–8911, reel 83291.

"Technical Development Division Summary of Activities No. 15," Federal Security Agency, Public Health Service, Communicable Disease Center, pp. 71, 72, 73, November 1, 1948.